(12) United States Patent
DeDe et al.

(10) Patent No.: US 8,882,029 B2
(45) Date of Patent: Nov. 11, 2014

(54) FIRE RESISTANT STRUCTURAL MOUNT YOKE AND SYSTEM

(75) Inventors: Brian C. DeDe, San Diego, CA (US);
David Lau, San Diego, CA (US);
Gordon F. Jewess, Rzeszow (PL)

(73) Assignee: United Technologies Corporation, Hartford, CT (US)

( * ) Notice: Subject to any disclaimer, the term of this patent is extended or adjusted under 35 U.S.C. 154(b) by 419 days.

(21) Appl. No.: 13/183,284

(22) Filed: Jul. 14, 2011

(65) Prior Publication Data

US 2013/0015291 A1   Jan. 17, 2013

(51) Int. Cl.
*B64D 27/00* (2006.01)
*B64D 41/00* (2006.01)

(52) U.S. Cl.
CPC .......... *B64D 41/00* (2013.01); *B64D 2041/002* (2013.01); *Y02T 50/44* (2013.01)
USPC .............................................. 244/58; 244/54

(58) Field of Classification Search
CPC .......................... B64D 41/00; B64D 2027/266
USPC ....... 244/53 R, 54, 58, 129.2, 117 R; 60/796, 60/797
See application file for complete search history.

(56) References Cited

U.S. PATENT DOCUMENTS

| | | |
|---|---|---|
| 4,634,081 A | 1/1987 | Chee |
| 6,039,287 A | 3/2000 | Liston et al. |
| 6,059,227 A | 5/2000 | Le Blaye et al. |
| 6,357,220 B1 | 3/2002 | Snyder et al. |
| 6,364,249 B1 | 4/2002 | Morgan et al. |
| 6,401,448 B1 * | 6/2002 | Manteiga et al. ............ 60/226.1 |
| 6,474,597 B1 | 11/2002 | Cazenave |
| 6,581,874 B2 | 6/2003 | Lemire et al. |
| 6,708,925 B2 * | 3/2004 | Udall .............................. 244/54 |
| 7,500,365 B2 | 3/2009 | Suciu et al. |
| 2008/0127774 A1 * | 6/2008 | Frost ........................... 74/606 R |

* cited by examiner

*Primary Examiner* — Brian M O'Hara
(74) *Attorney, Agent, or Firm* — Kinney & Lange, P.A.

(57) ABSTRACT

A mount yoke assembly comprises a first main hanger bracket and a first anchor bracket. The first main hanger bracket includes a first receiving portion for a first auxiliary power unit (APU) mount with first and second hanger arms. The first hanger arm includes a first hanger flange extending proximate a distal end of the first hanger arm. The first anchor bracket includes a first plurality of anchor holes and a first anchor flange. The first plurality of anchor holes are disposed substantially along a length of the first anchor bracket for securing the mount yoke assembly to a component of an APU assembly. The first anchor flange extends from the first anchor bracket for hingeably securing the first anchor bracket to the first main hanger bracket.

14 Claims, 4 Drawing Sheets

FIRE RESISTANT STRUCTURAL MOUNT YOKE AND SYSTEM

BACKGROUND

This application relates generally to systems and methods for securing aircraft components to the airframe, and more particularly systems and methods for securing the auxiliary power unit (APU) and its related components.

An APU assembly with its constituent components is typically secured to the body of an aircraft by a plurality of mount struts. The struts connect at one end to the airframe while the opposing end of each strut is attached to the APU component and/or housing via individual mounts. These mounts were previously fixed directly to the subject component or housing to transfer inertial, thrust, torsional and other loads to the multiple connecting struts between each mount and the airframe.

Critical systems and components like the APU must be able to resist failure during a number of emergency situations to optimize flight safety and maintain certification. One set of airworthiness regulations define the minimum duration of time that various aircraft components and systems must be able to withstand a fire. When the mount attaches directly to the assembly, and particularly when it is housed in a lightweight structure, the housing may be weakened or fail during a fire concentrated near one of the mounts. Thus it would be helpful to provide a system whereby the APU assembly can to withstand a fire for an increased time period without structural or operational failure.

SUMMARY

A mount yoke assembly comprises a first main hanger bracket and a first anchor bracket. The first main hanger bracket includes a first receiving portion for a first auxiliary power unit (APU) mount with first and second hanger arms. The first hanger arm includes a first hanger flange extending proximate a distal end of the first hanger arm. The first anchor bracket includes a first plurality of anchor holes and a first anchor flange. The first plurality of anchor holes are disposed substantially along a length of the first anchor bracket for securing the mount yoke assembly to a component of an APU assembly. The first anchor flange extends from the first anchor bracket for hingeably securing the first anchor bracket to the first main hanger bracket.

An auxiliary power unit (APU) mount assembly comprises a first APU mount, a strut for linking the first APU mount to a rigid structure, a first main hanger bracket and a first anchor bracket. The first main hanger bracket includes a first receiving portion removably securing the first APU mount to the first main hanger bracket. The first receiving portion is with first and second hanger arms. The first anchor bracket includes a first plurality of anchor holes and a first anchor flange. The first plurality of anchor holes are disposed substantially along a length of the first anchor bracket affixing the APU mount assembly to a first plurality of yoke connections on a first component of the APU assembly. The first anchor flange hingeably secures the first anchor bracket to the first main hanger bracket.

A method for retrofitting an APU mount assembly to an existing APU mount is disclosed. A first existing APU mount is removed from a first component of an APU assembly at a first mounting location. A first anchor bracket is secured to the first component of the APU assembly at a first plurality of yoke connections disposed proximate the first mounting location. The first anchor bracket has a plurality of anchor holes along its length, with a shape of the first anchor bracket and a location of at least one of the plurality of anchor holes corresponding to a position of at least one of the first plurality of yoke connections. The first anchor bracket is secured to a first hanger bracket at a first hinge portion disposed proximate a first distal end of the first hanger arm. The the first existing APU mount is secured to an APU mount receiving portion of the first hanger bracket.

DETAILED DESCRIPTION

Figure 1A:
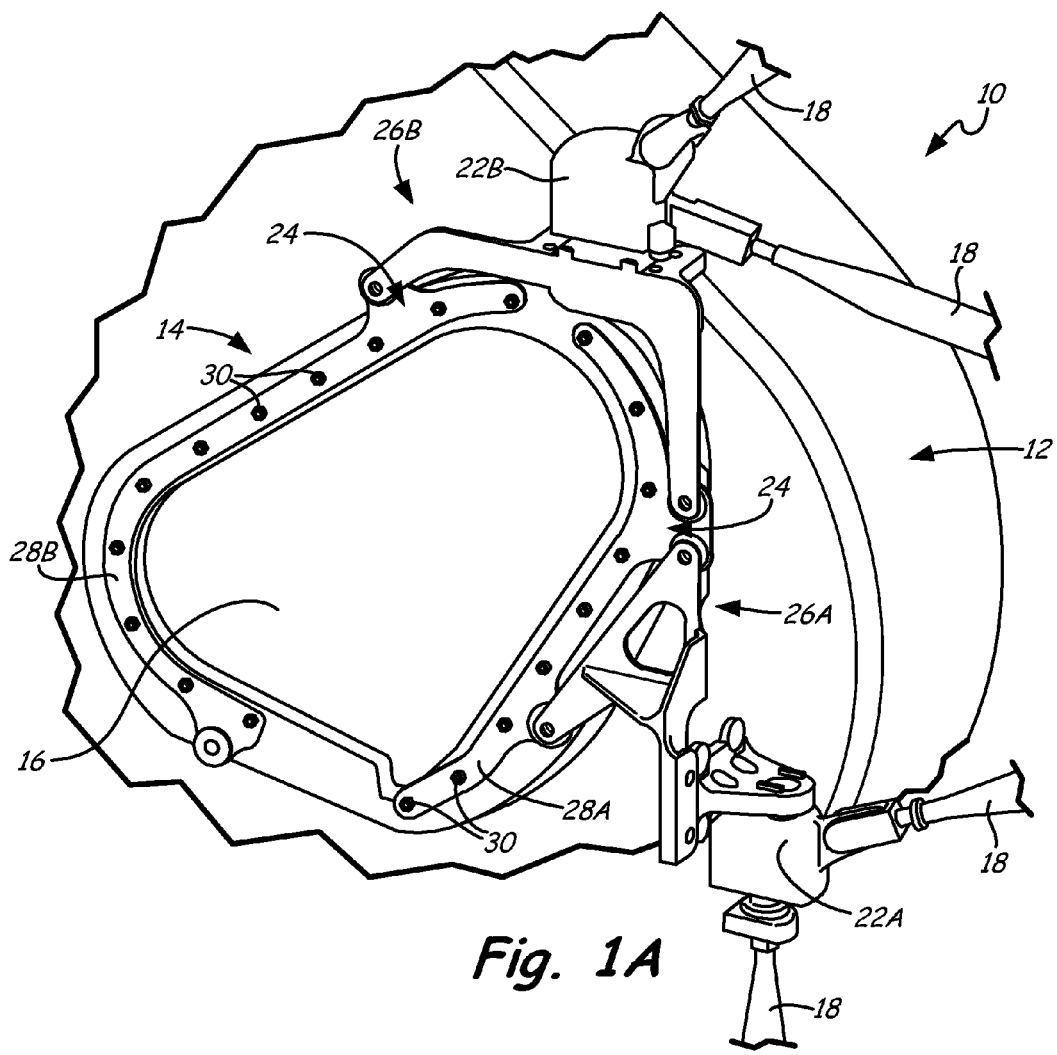
FIG. 1A schematically depicts an APU assembly secured via a plurality of mounts and a mount yoke assembly.

FIG. 1A shows APU assembly 10, APU 12, gearbox 14, housing 16, struts 18, APU mounts 22A, 22B, mount yoke assembly 24, main hanger brackets 26, yoke brackets 28, and anchor holes 30. APU assembly 10 includes APU 12 and gearbox 14 contained within housing 16. APU 12 provides electrical and/or hydraulic power for an aircraft, primarily upon startup and during emergencies. In many cases, including this example, APU 12 is a gas turbine engine configured in-line with gearbox 14. Gearbox 14 transfers rotational power of APU 12 to one or more electrical and/or hydraulic generators. The generators and other ancillary APU equipment are not shown in FIGS. 1A and 1B to better illustrate mount yoke assembly 24. In this example, these generators would be located in-line with APU 12 and gearbox 14 on the side of gearbox 14 opposing APU 12. In other words, the generator(s) would project outwardly from the page.

Because it is both an emergency and an auxiliary component, APU assembly 10 must meet stringent airworthiness standards and be available in the case of emergencies including those due to fire. Airworthiness regulations require that an APU and its housing be able to withstand a fire for a sufficient period of time. For example, current U.S. regulations mandate that the APU and gearbox be able to withstand 15 minutes of a 2000° F. (~1100° C.) fire. Previous mounting hardware included only struts and localized mounts fixed directly to the housing or other APU structure. This simple arrangement can generally meet certification standards if the fire generally occurs away from the mounts.

However, if the fire is concentrated directly around one or more of the localized mounts linking the housing to the airframe, the risk of failure increases. Failure from a directed conflagration is more likely when the housing comprises a lightweight material like aluminum or its alloys. Though aluminum alloys are often used to reduce overall weight, one option to meeting the standard would be to utilize a stronger material for the housing. However, aircraft structural materials are selected with an eye toward balancing cost, weight, and strength to minimize overall aircraft weight and improve efficiency. Components like APUs and their ancillary structures can add substantial mass to the aircraft. Thus, high-strength aluminum alloys are frequently used for housing the APU and gearbox due to cost and weight considerations, despite the lower melting point of such alloys as compared to steel or titanium.

When mounts without yokes or other brackets are used to secure an APU assembly, the support forces are often concentrated over a small mount footprint on the housing. As such, an aluminum or other lightweight housing is more likely to fail relatively quickly in the event of a fire occurring proximate one or more of the localized art mount locations. Once the aluminum alloy begins to soften from elevated temperatures, inertial and operational forces (which are often more intense due to emergency maneuvers occurring during an onboard fire), can overcome the ability of that portion of the housing to support the APU assembly. The remaining struts and mounts must then absorb the remaining forces. However, support imbalances become more pronounced, which increases the likelihood that the housing will fail in other locations, particularly if the fire spreads toward the remaining mounts.

In contrast to a localized mounting structure, FIG. 1A shows mount yoke assembly 24 which engages with APU mounts 22A, 22B to support APU assembly 10 substantially around the perimeter of housing 16. Mount yoke assembly 24 includes at least one main hanger bracket 26A and at least one yoke anchor bracket 28A. Main hanger brackets 26A, 26B each include a receiving portion (shown in FIGS. 2 and 3A), which is shaped to slidably or mountably engage corresponding mounts 22A, 22B, while anchor brackets 28A, 28B are hingeably connected to respective hanger brackets 26A, 26B. Anchor brackets 28A, 28B are secured to housing 16 using anchor holes 30. For example, anchor holes 30 can receive bolts, pins, or other fasteners passing through anchor holes 30 and yoke connections on housing 16. (examples shown in FIG. 1B).

One or more struts 18 then join each mount 22A, 22B to the airframe or other rigid structure (not shown). As such, struts 18, mounts 22A, 22B, and mount yoke assembly 24 cooperate to support APU assembly 10 and transfer operational and inertial forces to the body of the aircraft. The combination of mounts 22A, 22B and mount yokes 24 takes forces ordinarily concentrated only around the relatively small footprint of individual localized mounts and distributes them over a much larger footprint on housing 16. Mount yoke assembly 24 supports APU assembly 10 over a substantial portion of housing 16, so thus it would take a much larger and more widespread fire over the larger footprint in order to cause failure of housing 16 or other APU components.

Mounts 22A, 22B can be new mounts fabricated specifically for this purpose. They can alternatively be existing mounts which are modified if necessary to improve engagement with yoke assembly 24. In some cases, mounts 22A, 22B are modified or replaced to more easily accommodate corresponding hanger brackets 26A, 26B. For example, portions of existing mounts 22A, 22B may be extended, shortened, or reshaped to improve the transfer of forces between APU assembly 10 and struts 18. And while the design may not be optimal as compared to a new installation, retrofitting mount yoke assembly 24 to APU assembly 10 can inexpensively and simply allow existing APU assemblies to meet more stringent airworthiness requirements.

Many existing mounts 22A, 22B are based primarily on austenitic steel, such as but not limited to ASTM 304L. However, new or existing mounts 22A, 22B can be any material of sufficient strength and thickness to meet certification requirements. Mounts 22A, 22B can also include other features such as but not limited to various joints, knuckles, etc. to help withstand bending and twisting motion of APU assembly 10 relative to struts 18. Regardless of its exact features, mounts 22A, 22B include one or more structures to connect with mount yoke assembly 24, an example of which will be seen in more detail in FIGS. 2 and 3A.

Figure 1B:
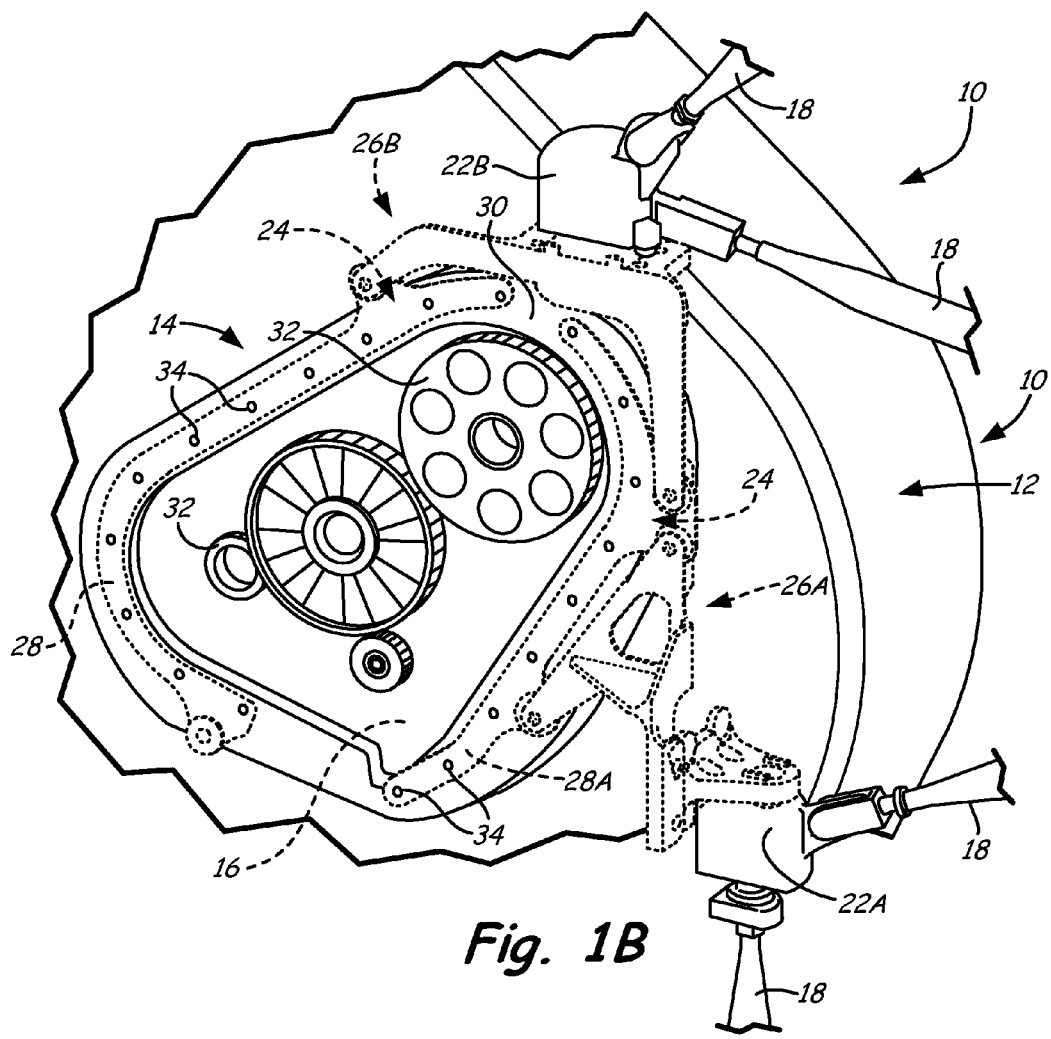
FIG. 1B shows APU assembly with one example mounting location for the mount yoke assembly.

FIG. 1B includes APU assembly 10 from FIG. 1A with APU 12, gearbox 14, housing 16, gears 32, and yoke connections 34. Struts 18, mounts 22A, 22B, mount yoke assembly 24, main hanger brackets 26A, 26B, and yoke anchor brackets 28A, 28B, also from FIG. 1A, are shown in phantom to better illustrate the underlying features of gearbox 14 and housing 16.

FIG. 1B shows a portion of housing 16 cut away from gearbox 14 to better illustrate gears 32. Gears 32 optimize APU shaft power for auxiliary accessories such as electrical and/or hydraulic generators (not shown). It can be seen that anchor brackets 28 are sized and shaped to avoid interfering with the operation and interaction of gears 32 and other internal components of gearbox 14. This can be done, for example by providing yoke connections 34 substantially around the perimeter of housing 16, which correspond to anchor holes 30 on brackets 28A, 28B. Anchor brackets 28A, 28B also can be shaped to avoid interference with generators or other APU-driven components (not shown) to be mounted proximate the visible face of gearbox 14. In this example, securing yoke assembly 24 to housing 16 does not interfere with the operation of gearbox 14 even when the securing means such as bolts or pins extend into the interior of housing 16.

Housing 16 also includes yoke connections 34 to engage fasteners like bolts or anchors. In the example shown in FIGS. 1A and 1B, brackets 28A, 28B are shaped to fit around parts of gearbox 14, and are aligned to correspond with anchor holes 30 (shown in FIG. 1A) of anchor brackets 28A, 28B. Yoke connections 34 can be existing pre-drilled connections for generators or other ancillary APU components, or they can be added specifically for the purpose of attaching mount yoke assembly 24. Yoke connections 34 can include simple threaded or unthreaded bolt holes or flanges, and can additionally or alternatively include one or more bosses.

Mounts 22A, 22B and mount yoke assembly 24 can either be designed for incorporation into a new APU assembly 10, or for retrofit onto an existing design. In the case of a new design, the shape of anchor brackets 28A, 28B, along with the arrangement of anchor holes 30, and yoke connections 34 are selected as part of the design process to achieve an overall optimal balance between strength, size, cost, and weight. In a retrofit application, locations on housing 16 are selected or added for yoke connections 34 with these factors in mind as well. However, the locations may deviate from the optimal support arrangement in order to utilize existing features of housing 16, while still being sufficient to meet or exceed fire safety and airworthiness regulations.

In the case of a retrofit, there are often unused potential mounting locations on the components of APU assembly 10. These mounting locations are identified and reinforced if necessary to act as yoke connections 34. Anchor brackets 28 are shaped to align with these yoke connections 34 and provided with corresponding anchor holes 30. Additional yoke connections 34 can be added if needed to further increase the footprint of mount yoke assembly 24. Hanger brackets 26 are then provided with a receiving portion for a mount 22A, 22B and with flanges or other hinge-like structures to engage with complementary flanges on anchor brackets 28A, 28B. As such, anchor holes 30 and corresponding yoke connections 34 each provide a plurality of individual connections over a substantial portion of housing 16 that replace the single connection originally provided by each single APU mount location.

Regardless of whether yoke assembly 24 is for a new design or a retrofit, it operates to substantially increase the footprint linking APU assembly 10 (including housing 16) to struts 18. While yoke assembly 24 often causes a marginal weight increase as compared to mounting APU assembly 10 directly to mounts 22A, 22B, the increased margin of safety in the event of a fire is well worth any de minimis efficiency loss. Further, yokes 24 nevertheless have a substantial weight advantage over replacing the entire housing 16 with a stronger and more temperature resistant material like titanium or steel which may otherwise be required to meet certification standards.

In this illustrative example, mount yokes 24 have been shown relative to a gearbox 14 mounted in-line with APU 12. However, mount yokes 24 are applicable to any configuration of an APU and gearbox to improve fire resistance of one or more connections between the mounts and the APU assembly. In addition, the example in FIGS. 1A and 1B depict mount yoke assembly 24 as being removably secured to the exterior of housing 16. However, it will be appreciated that yoke assembly 24 can be similarly secured to the interior of APU 12, such as to an inner surface of housing 16.

Figure 2:
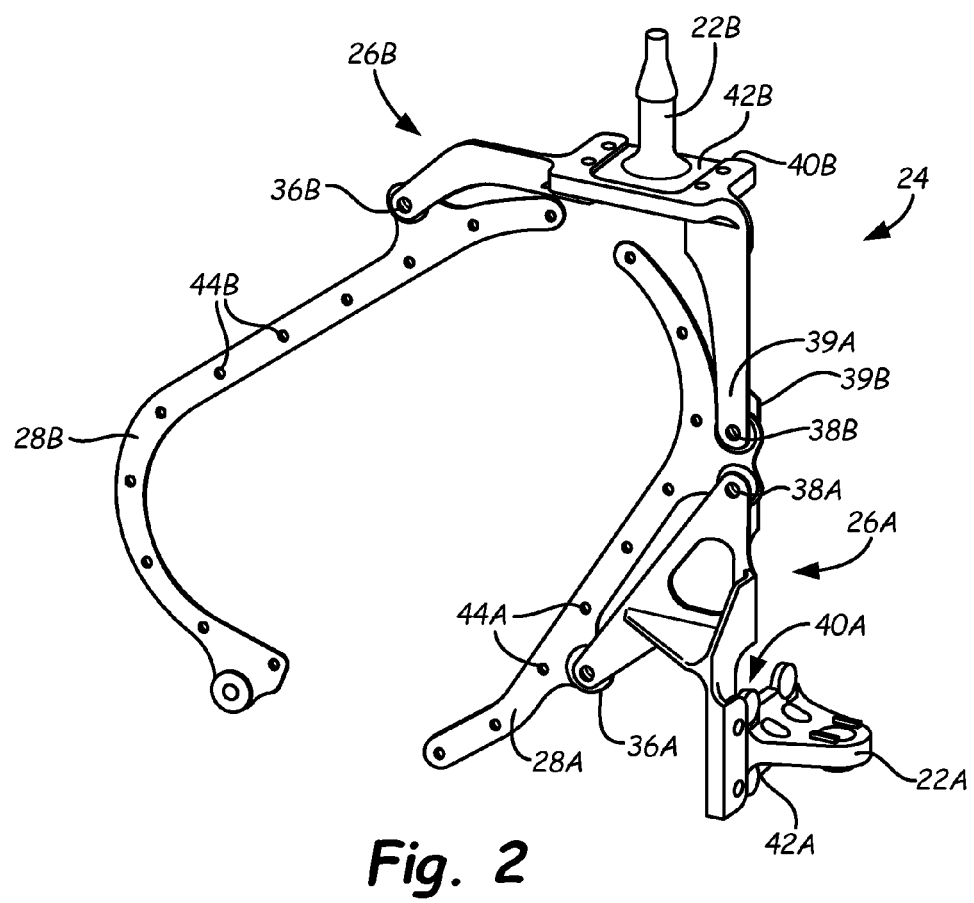
FIG. 2 shows the APU mount yoke assembly.

FIG. 2 depicts mounts 22A, 22B yoke assembly 24, main hanger brackets 26A, 26B, anchor brackets 28A, 28B, anchor holes 30A, 30B, hinges 36A, 36B, 38A, 38B, mount receiving portions 40A, 40B, and mount bases 42A, 42B.

As described above, mount yoke assembly 24 includes at least one of two primary components, main hanger brackets 26A, 26B and anchor brackets 28A, 28B. In this example, hanger bracket 26A is secured to anchor bracket 28A at hinges 36A and 38A via pins or bolts. Optionally, the pins or bolts can also extend into a boss or other receiving structure on the APU assembly. In addition, hinges 36A, 38A can alternatively be other similar connecting structures such as flanges 39A, 39B, clevises, or shackles, to name a few.

Hanger brackets 26A, 26B are respectively secured to mounts 22A, 22B at receiving portions 40A, 40B. In this illustrative example, mounts 22A, 22B are slidably connected to respective hanger brackets 26A, 26B between receiving portions 40A, 40B and mount bases 42A, 42B. Alternatively, mounts 22A, 22B and/or hanger brackets 26A, 26B can include other suitable complementary engaging structures. Hanger brackets 26A, 26B can also be permanently or semi-permanently integrated with mounts 22A, 22B.

Also note in this illustrative example, hanger bracket 26B is secured at opposing ends to both anchor brackets 28A, 28B. Hinge 36B links hanger bracket 26B to anchor bracket 28B, while hinge 36A joins anchor bracket 28A to hanger bracket 26B. Connecting hanger bracket 26B to multiple anchor brackets 28A, 28B and/or connecting one anchor bracket 28A to multiple hanger brackets 26A, 26B, can be done such as is illustrated here in yoke assembly 24. One reason for doing this, for example, is when anchor bracket 28A is required to support a greater load that is better distributed among multiple mounts 22A, 22B.

Figure 3A:
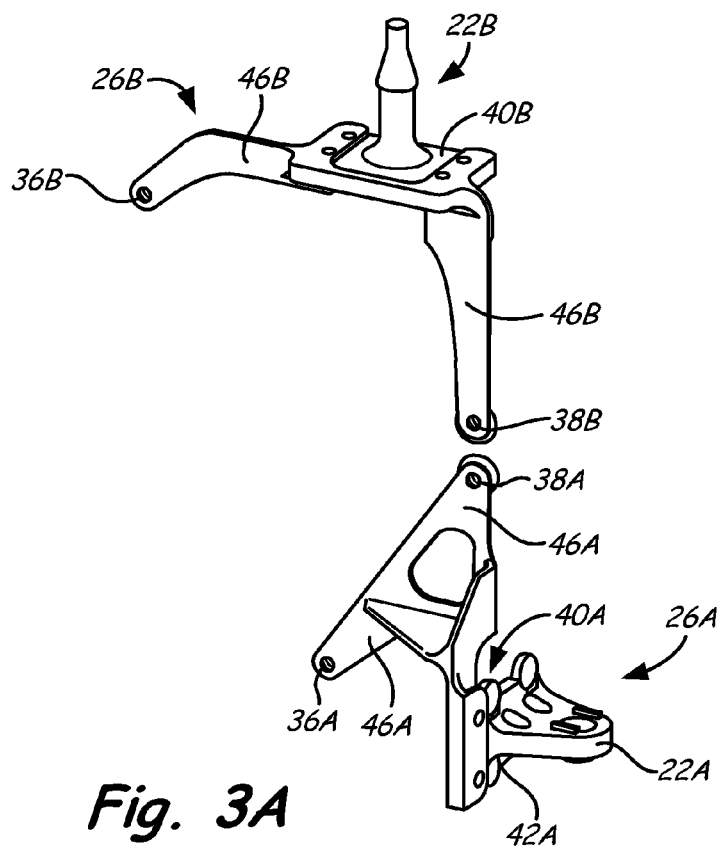
FIG. 3A depicts the main hanger bracket portions of the mount yoke assembly.

FIG. 3A depicts hanger brackets 26A, 26B with hinges 36A, 36B, 38A, 38B mount receiving portions 40A, 40B, and hanger arms 46A, 46B.

Figure 3B:
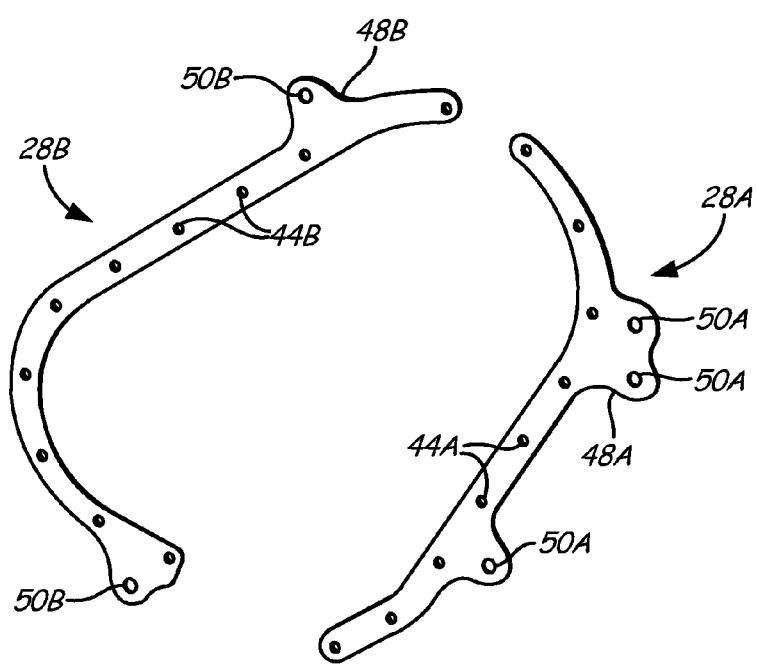
FIG. 3B shows the anchor bracket portions of the mount yoke assembly.

As described with respect to FIG. 2, hanger brackets 26A, 26B provide the respective connections between mounts 22A, 22B and anchor brackets 28A, 28B (shown in detail in FIG. 3B). Each hanger bracket 26A, 26B is connected to at least one anchor bracket 28, which can be seen in the case of hanger bracket 26A, which includes arms 46A and hinges 36A, 38A. In some alternative cases, hanger arms 46A are symmetrical depending on the old and new position of mounts 22A, 22B and the loads to be supported by yoke assembly 24. In the case of hanger bracket 26B, it is connected to both anchor brackets 28A, 28B via hinges 36B and 38B at respective distal ends of hanger arms 46B.

Selection of the mounting arrangement of hanger brackets 26 and anchor brackets 28 is primarily governed by the orientation of brackets 28A, 28B and the positions of mounts 22A, 22B relative to APU assembly 10. In this illustrative case of retrofitting yoke assembly 24 to APU assembly 10, the configuration of anchor brackets 28A, 28B is determined in part by the presence of existing mounting locations or bosses around housing 16 that can also serve as yoke connections 34 (shown in FIG. 1B). Other configurations will necessarily require a slightly different structure for hanger brackets 26A, 26B and/or anchor brackets 28A, 28B.

FIG. 3B shows anchor brackets 28A, 28B with anchor holes 30A, 30B, flanges 48A, 48B and hanger holes 50A, 50B.

Brackets 28A, 28B include flanges 48A, 48B and hanger holes 50A, 50B for connection to hanger brackets 26A, 26B. In addition, brackets 28A, 28B include a plurality of anchor holes 30A, 30B for securing brackets 28A, 28B to APU assembly 10 generally and (in this example) housing 16 as shown in FIGS. 1A and 1B. As previously described, in this example, brackets 28 are shaped to correspond to the underlying elements of gearbox 14 (such as gears 32) or other component of APU assembly 10. Brackets 28A, 28B then can be fixed via bolts or other securing means through anchor holes 30A, 30B to housing 16 or other component of APU assembly 10.

Yoke assembly 24 increases the available support footprint such that the area around each yoke connection 34 (shown in FIG. 1B) is not failure critical. Thus, the surrounding housing experiences a much more manageable load between each individual pair of anchor hole 30 and yoke connection 34. The risk of failure of APU assembly 10 due to a fire around the mount locations is thus significantly decreased due to the extremely unlikely event of a fire extending along the entire area of one or more brackets 28A, 28B.

In this example, both hanger brackets 26A, 26B and anchor brackets 28A, 28B are fire resistant metal alloys, which can include certain high-temperature grades of austenitic steel such as, but not limited to ASTM 304L. Other example grades include ASTM 321 and 347. Many titanium alloys can also withstand fires for the required time period. Suitable examples include but are not limited to ASTM Grade 5 and 6 titanium alloys.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mount yoke assembly comprising:
   a first main hanger bracket including a first receiving portion for a first auxiliary power unit (APU) mount, a first hanger arm, a second hanger arm, and at least one hinge portion proximate a distal end of the first or second hanger arms; and
   at least one elongated anchor bracket including a plurality of anchor holes and at least one anchor flange, the plurality of anchor holes disposed along a length of the at least one elongated anchor bracket for securing the mount yoke assembly to at least one component of an APU assembly, and the anchor flange extending from the at least one anchor bracket for hingeably securing the at least one anchor bracket to the at least one hinge portion of the first main hanger bracket;

wherein the at least one component comprises a gearbox housing having a plurality of yoke connections disposed around a perimeter of the gearbox housing; and wherein the at least one anchor bracket is secured to the perimeter of the gearbox housing with all of the yoke connections fastened to corresponding ones of said plurality of anchor holes.

2. The mount yoke assembly of claim 1, wherein the at least one hinge portion comprises a first hanger flange and a second hanger flange adjacent and substantially parallel to the first hanger flange defining a region between the first and second hanger flanges for receiving the at least one anchor flange.

3. The mount yoke assembly of claim 1, wherein the first main hanger bracket includes a first hinge portion proximate a distal end of the first hanger arm, and a second hinge portion proximate a distal end of the second hanger arm.

4. The mount yoke assembly of claim 1, further comprising a second main hanger bracket including a second receiving portion for a second auxiliary power unit (APU) mount, a third hanger arm, and a fourth hanger arm.

5. The mount yoke assembly of claim 4, wherein the first elongated anchor bracket includes a second anchor flange for hingeably securing the first anchor bracket to a third hinge portion proximate a distal end of the third hanger arm on the second main hanger bracket.

6. The mount yoke assembly of claim 1, wherein:

the at least one elongated anchor bracket includes a first elongated anchor bracket and a second elongated anchor bracket each including at least one anchor flange; and the plurality of anchor holes includes a first set of anchor holes disposed along a length of the first elongated anchor bracket, and a second set of anchor holes disposed along a length of the second elongated anchor bracket, such that the first and second elongated anchor brackets are securable to the corresponding ones of the plurality of yoke connections for securing the mount yoke assembly to the at least one component of the APU assembly.

7. The mount yoke assembly of claim 6, wherein the at least one anchor flange is disposed in a location on the second elongated anchor bracket for hingeably securing the second elongated anchor bracket to the first main hanger bracket.

8. The mount yoke assembly of claim 6, wherein the at least one anchor flange is disposed in a location on the second elongated anchor bracket for hingeably securing the second elongated anchor bracket to a second main hanger bracket, the second main hanger bracket including a second receiving portion for a second auxiliary power unit (APU) mount, a third hanger arm, and a fourth hanger arm.

9. The mount yoke assembly of claim 1, wherein the gearbox housing is manufactured from an aluminum alloy.

10. The mount yoke assembly of claim 1, wherein the first main hanger bracket and the at least one elongated anchor bracket are formed from one of: an austenitic steel or a titanium alloy.

11. An auxiliary power unit (APU) mount assembly comprising:

a first APU mount;

a strut for linking the first APU mount to a rigid structure;

a first main hanger bracket including a first hanger arm, a second hanger arm, a first hinge portion proximate a distal end of the first hanger arm, and a first receiving portion for removably securing the first APU mount to the first main hanger bracket;

a first elongated anchor bracket including a first plurality of anchor holes and at least one first anchor flange, the first plurality of anchor holes disposed along a length of the first elongated anchor bracket for securing the auxiliary power unit (APU) mount assembly to a gearbox housing, the at least one first anchor flange hingeably securing the first elongated anchor bracket to the first hinge portion of the first main hanger bracket; and a second elongated anchor bracket including a second plurality of anchor holes and at least one second anchor flange, the second plurality of anchor holes disposed along a length of the second elongated anchor bracket for securing the auxiliary power unit (APU) mount assembly to the gearbox housing:

wherein the gearbox housing has a plurality of yoke connections disposed around a perimeter of the aearbox housing, and wherein the first and second anchor brackets are each secured to the perimeter of the gearbox housing with all of the yoke connections fastened to corresponding ones of said first and second pluralities of anchor holes.

12. The APU mount assembly of claim 11, wherein the gearbox housing is manufactured from an aluminum alloy.

13. The APU mount assembly of claim 11, wherein at least some of said plurality of connections disposed around the perimeter of the gearbox housing can withstand fire of 2000° F. for at least 15 minutes.

14. The APU mount assembly of claim 11 wherein the at least one second anchor flange hingeably secures the second anchor bracket to the first main hanger bracket.

* * * * *